July 5, 1966  SABURO NISHIMURA  3,259,046
VACUUM SUCTION TYPE FILM HOLDER

Filed Oct. 14, 1963  2 Sheets-Sheet 1

INVENTOR.
SABURO NISHIMURA
BY Herman L. Gordon
ATTORNEY

July 5, 1966  SABURO NISHIMURA  3,259,046
VACUUM SUCTION TYPE FILM HOLDER

Filed Oct. 14, 1963  2 Sheets-Sheet 2

INVENTOR.
SABURO NISHIMURA
BY Herman L. Gordon
ATTORNEY

3,259,046
VACUUM SUCTION TYPE FILM HOLDER

Saburo Nishimura, Sakyo-ku, Kyoto, Japan, assignor to Dainippon Screen Seizo Kabushiki Kaisha (Dainippon Screen Mfg. Co., Ltd.), Kamikyo-ku, Kyoto, Japan
Filed Oct. 14, 1963, Ser. No. 315,987
2 Claims. (Cl. 95—66)

This invention relates to a vacuum-suction type film holder adapted for use in a gallery type process camera. The film holder of the invention is particularly adapted, among other possible uses, for making a halftone negative or positive with a contact screen. In one of its aspects the invention relates more specifically to a film holder construction of the above character which, as hereinafter set forth in greater detail, has certain advantages in obtaining flatness of the film and the complete contact of said film with the flat base plate of the film holder and with the associated contact screen.

Hitherto several solutions have been suggested for the positioning of the film in such a gallery type process camera. In case of a film of small size, it has been inserted into a same size of holder or has adhered to a flat base plate with an adhesive tape. In case of a film of relatively large size, it has been stuck to a flat base plate such as a glass plate whose surface has been coated with an adhesive agent, viz. Stayflat (a synthetic resin adhesive) or a mixture of gelatin and glycerin.

The various solutions which have been suggested hereto have the disadvantages of not obtaining complete flatness of film. It requires much trouble for dismounting of the film. Especially, in making a halftone negative or positive with a contact screen, it is almost impossible to obtain a close and uniform contact therebetween all over the surfaces. Thus, if a vacuum suction is applied to such a film holder, a satisfactory result will be obtained. In a darkroom type process camera, wherein the whole camera or the rear case is disposed in a darkroom, the flat base plate is provided with many small apertures or grooves from which air is exhausted by a vacuum pump so as to attract the film and the contact screen toward the surface of said flat base plate.

In application of the vacuum suction method to a gallery type camera, however, the film holder, when it is carried from place to place, must always be connected to the vacuum pump in order to hold the film by vacuum suction at the correct position on the base plate. It means that the suction pipe cannot be removed from the film holder.

Besides, process cameras employing a film holder are constructed in relatively small sizes. So that, if such camera is reconstructed to be furnished with a rear darkroom, its construction will be complicated and its fitting itself will be troublesome, resulting in drawbacks in the operation of the machine. Furthermore, in the type of whole darkroom camera, the place of installation will be a darkroom and a gallery, requiring a relatively large area of floor. And, if the gallery itself is a darkroom, it will not allow use of the place to perform other work.

The present invention has for its object to remedy the above disadvantages. According to the invention, the film holder is provided with a magnetic flat base plate having exhaust grooves on the surface thereof. The photosensitive film is placed, in a darkroom, on the said magnetic flat base plate, and at the same time a magnet or magnets are placed on the margin portion of said film; thus the force of magnetic attraction keeps the film from slipping off the base plate when the film holder is carried to the camera. And also, when a contact screen is used for making a halftone negative or positive, the magnets are placed on the end portions of said contact screen after positioning the film on the magnetic flat base plate, whereby the magnetic attraction holds the film as well as the contact screen at the initial position in which they are placed. After mounting the film holder on the camera, the exhaust grooves on the base plate are connected to an exhaust pipe connecting to a vacuum pump. This vacuum pump acts, when it is driven, to attract by its suction the film and the contact screen to the flat base plate, and thus the film is stuck fast to the flat base plate together with the contact screen.

In accordance with the present invention, the film is previously located and held at the correct position with or without the contact screen on the flat base plate of the film holder under the action of magnetic attraction, and the vacuum pump is driven only after mounting the film holder on the camera. In view of the above object, the exhaust pipe of the film holder is provided with a means for protecting the film from unwanted exposure.

Further objects and advantages of the invention will be in part obvious and in part specifically referred to in the description hereinafter contained which, taken in conjunction with the accompanying drawings, discloses a preferred form of film holder constructed to operate in accordance with the invention; the disclosure however should be considered as merely illustrative of the principle of the invention, in its broader aspects. In the drawings.

Figure 1:
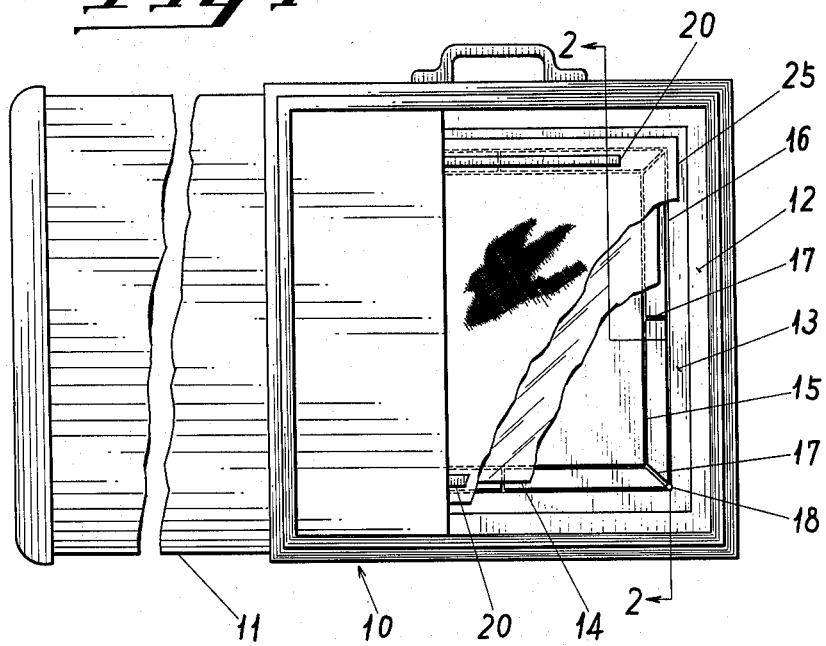
FIG. 1 is a front view, showing some of the parts cut away, of a film holder constructed to operate in accordance with the invention with a contact screen.
Figure 2:
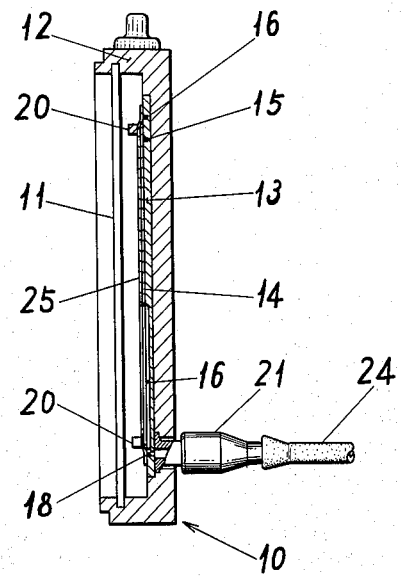
FIG. 2 is a section as seen at 2—2 of FIG. 1.
Figure 3:
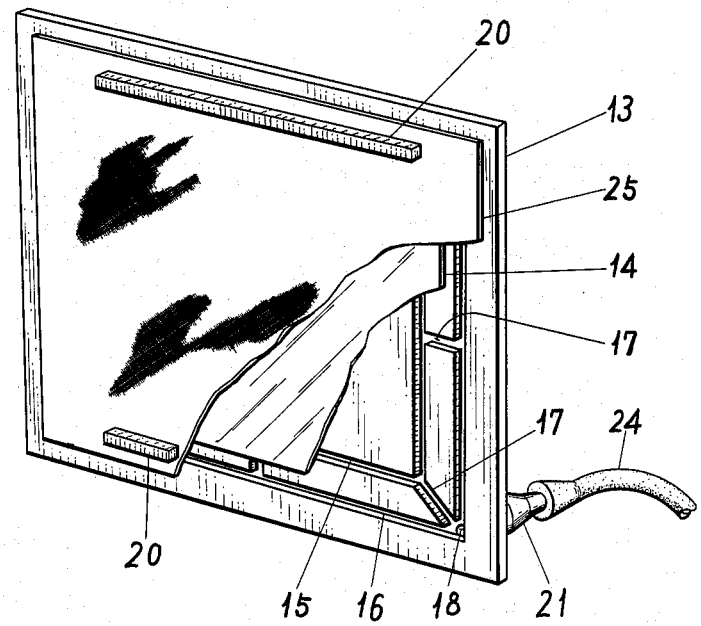
FIG. 3 is a perspective view, with certain parts cut away, showing the manner to position the film with the contact screen on the flat base plate of the film holder.

As shown in the drawings the film holder comprises a casing designated generally as reference numeral 10 forming the body of the film holder, closed by a front shutter plate 11. The interior surface of the side wall 12 of the casing 10 is provided with a flat magnetic plate 13 which serves as the base plate to place a film 14. Numerals 15 and 16 are grooves provided in the form of concentric squares connected to each other by grooves 17, 17 on the surface of the base plate 13. The outer groove 16 is provided with an air passageway 18 which penetrates the base plate 13. An exhaust pipe 19 is fixed to the back of the base plate 13 and it extends through the side wall 12, leading through the air passageway 18 to the outside of the casing 10. A vacuum pump (not shown) is connected to the exhaust pipe 19.

To use this film holder, I first place the film 14 at the correct position on the magnetic flat base plate 13, as described above, then the magnets 20, 20 are placed on the margin portions of the film 14. This operation is performed, of course, in a darkroom. After covering the casing 10 with the front shutter plate 11, the film holder is ready for mounting on a camera which is placed outside of the darkroom.

Figure 4:
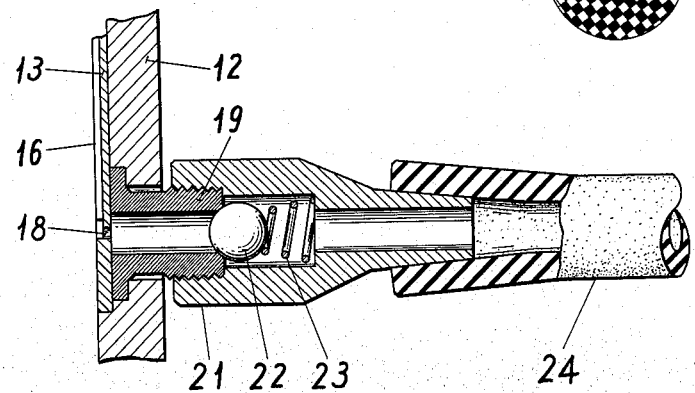
FIG. 4 is an enlarged detail fragmentary sectional view of the exhausting portion of the film holder, in which the exhaust pipe is equipped with a blind device.

In order to protect the film 14 from being affected by the light that comes through the air passageway 18, a covering means must be applied there. In the preferred embodiment shown in FIG. 4, a valve tube 21 is screwed onto the exhaust pipe 19. Disposed in the tube 21 is a ball valve 22 which is normally urged by a compressed coiled spring 23 toward the outlet of the exhaust pipe 19 so as to cover the passageway 18. However, the covering means is not critical. For instance, if the exhaust pipe 19 is bent and its interior surface is blackened to intercept reflected light, the above-mentioned purpose will satisfactorily be achieved.

When the film holder is mounted on the camera, the valve tube 21 is connected by a rubber tube 24 to the vacuum pump. When the vacuum pump is driven, its vacuum suction pulls the ball 22 against the spring 23 and opens the air passageway 18. Then, it exhausts air from the grooves 15, 16 and 17 through the passageway 18 and thus attracts the film 14 to the flat base plate 13, resulting in maintaining the complete flatness of the film 14. Now, the shutter plate 11 is removed from the front of the film 14, and it is ready to take a picture. Since the film is maintained completely flat according to the invention, the picture will be taken very properly.

Figure 5:
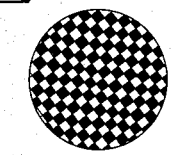
FIG. 5 is an enlarged plan view of a small portion of the contact screen.

The film holder of the invention is suitable for making a halftone negative or positive with a contact screen 25 which is made of a film material having a chessboard pattern as illustrated in the drawings, especially in FIG. 5. In this case, the size of the film 14 is made smaller than that of the contact screen 25 as shown in the drawings. Namely, the film 14 covers the inner groove 15 only, and the contact screen 25 covers the outer groove 16. The magnets 20, 20 are placed on the end portions of the contact screen 25 for holding the contact screen 25 as well as the film 14 at the place where they are initially positioned. In operation, the vacuum which is formed at the inner groove 15 attracts the film 14, while the contact screen 25 adheres to the film 14 by the vacuum suction at the outer groove 16.

The arrangement of the grooves 15, 16 and 17 on the surface of the magnetic flat base plate 13 is not critical. Any pattern, e.g. radial, stripes, fretted, checked, dotted lines', etc., of suction grooves may be applicable, provided that they communicate to the air passageway 18.

In the preferred embodiment, the magnets 20, 20 are formed into bars. However, they may be of any shape of magnets, e.g. disc magnets. If the magnets 20, 20 are formed into flexible strips of rubber admixed with ferromagnetic substance, they will be convenient to handle. Though it is not illustrated in the drawings, the bottom surfaces of such magnets 20, 20 are covered with sheets of soft material such as flannel, velvet, etc. having a larger width than that of the bar magnets 20, 20 lest the film and the contact screen be damaged by the magnets or be given the operator's finger-mark.

In the preferred embodiment of the invention, the magnetic flat base plate 13 is made of an iron plate of about 1 mm. in thickness, but any magnetic material may be used. In order to reduce the weight, a light metallic plate such as iron- or nickel-plated aluminum plate may be used. Or we may use a multi-layer plate having thin plates or iron or nickel.

The depth of the grooves 15, 16 and 17 is optional, but it is preferred to make them as deep as possible so as not to be clogged by the bent film or contact screen under the action of their vacuum suction when the vacuum pump is driven. This vacuum pump may, of course, be replaced by a suction blower.

FIG. 5 shows by way of example a typical pattern of the contact screen. It is to be understood that the invention is not to be limited to this specific pattern of contact screen.

What I claim is:

1. A film holder for conveying a photosensitive film from a darkroom to a camera outside the darkroom and for subsequently exposing the film in the camera comprising a generally rectangular, substantially flat casing provided with a slidable front shutter plate for sealing the casing against the entry of light while a film is being conveyed in the holder, said casing having a rear wall, a flat base plate of magnetic material secured to said rear wall, said base plate being formed with a plurality of similar closed-figure grooves of different size, one within the other and spaced to have substantially the same center point, said grooves being located so that the outer closed-figure groove surrounds the major portion of the area of the base plate, said base plate being formed with additional grooves interconnecting said spaced grooves, conduit means connected to said casing in communication with said grooves for connecting said grooves to a vacuum pump, and a pair of elongated relatively narrow permanent magnet bars of substantial length receivable in the casing at opposite marginal portions thereof for clamping the corresponding marginal portions of a film to said base so that the film may be subsequently exposed in the camera while being clamped to the base plate with the major portion of the film substantially unobstructed by said magnet bars, said length being of the same order as opposite marginal portions of the magnetic base plate, said magnet bars comprising flexible strips of rubber-like material admixed with permanently magnetized ferromagnetic material.

2. The film holder recited in claim 1, and wherein the closed-figure grooves are generally rectangular in shape with their sides substantially parallel to the respective sides of the casing.

References Cited by the Examiner
UNITED STATES PATENTS

| | | | |
|---|---|---|---|
| 2,177,905 | 10/1939 | McKeehan | 317—159 |
| 2,568,505 | 9/1951 | Maxwell | 88—24 |
| 3,066,592 | 12/1962 | Ott | 95—76 |
| 3,146,690 | 9/1964 | Hoffman | 95—69 |

JOHN M. HORAN, *Primary Examiner.*